United States Patent
Garner et al.

(10) Patent No.: US 10,273,184 B2
(45) Date of Patent: Apr. 30, 2019

(54) ION EXCHANGE PROCESSES AND CHEMICALLY STRENGTHENED GLASS SUBSTRATES RESULTING THEREFROM

(71) Applicant: Corning Incorporated, Corning, NY (US)

(72) Inventors: Sean Matthew Garner, Elmira, NY (US); Michael Lesley Sorensen, Waverly, NY (US)

(73) Assignee: Corning Incorporated, Corning, NY (US)

( * ) Notice: Subject to any disclaimer, the term of this patent is extended or adjusted under 35 U.S.C. 154(b) by 290 days.

(21) Appl. No.: 15/026,691

(22) PCT Filed: Oct. 13, 2014

(86) PCT No.: PCT/US2014/060241
§ 371 (c)(1),
(2) Date: Apr. 1, 2016

(87) PCT Pub. No.: WO2015/057552
PCT Pub. Date: Apr. 23, 2015

(65) Prior Publication Data
US 2016/0214889 A1    Jul. 28, 2016

Related U.S. Application Data

(60) Provisional application No. 61/890,530, filed on Oct. 14, 2013.

(51) Int. Cl.
*C03C 21/00* (2006.01)
*B32B 17/06* (2006.01)
(Continued)

(52) U.S. Cl.
CPC .......... *C03C 21/002* (2013.01); *B32B 17/061* (2013.01); *B32B 17/064* (2013.01);
(Continued)

(58) Field of Classification Search
CPC ................................. B32B 17/10137
See application file for complete search history.

(56) References Cited

U.S. PATENT DOCUMENTS 3,445,316 A    5/1969    Megles
3,467,508 A    9/1969    Loukes et al.
(Continued)

FOREIGN PATENT DOCUMENTS

CN    103553354 A    2/2014
EP    0875490 A1    11/1998
(Continued)

OTHER PUBLICATIONS

Karlsson et al.; "The technology of chemical glass strengthening—a review"; Glass Technol.: Eur. J. Glass Sci. Technol. A, Apr. 2010, 51 (2); pp. 41-54.
(Continued)

*Primary Examiner* — David Sample
(74) *Attorney, Agent, or Firm* — Kevin M. Able; Jeffrey A. Schmidt

(57) ABSTRACT

A method of performing ion exchange of a thin, flexible glass substrate having an average thickness equal to or less than about 0.3 mm to chemically strengthen the glass substrate is disclosed. The chemically strengthened glass substrate comprises a first compressive stress layer having a first depth of layer, and a second compressive stress layer having a second depth of layer, the first and second stress layers being separated by a layer of tensile stress. A laminated article comprising the chemically strengthened glass substrate is also described.

9 Claims, 6 Drawing Sheets

(51) Int. Cl.
  *B32B 17/10* (2006.01)
  *C03C 3/076* (2006.01)
  *C03C 3/078* (2006.01)
  *C03C 3/083* (2006.01)
  *C03C 3/085* (2006.01)
  *C03C 3/087* (2006.01)
  *C03C 3/089* (2006.01)
  *C03C 3/091* (2006.01)
  *C03C 3/093* (2006.01)
  *C03C 3/095* (2006.01)
  *C03C 4/18* (2006.01)

(52) U.S. Cl.
  CPC ........ *B32B 17/10137* (2013.01); *C03C 3/076* (2013.01); *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 3/095* (2013.01); *C03C 4/18* (2013.01)

(56) References Cited

U.S. PATENT DOCUMENTS

| | | | |
|---|---|---|---|
| 3,625,792 | A | 12/1971 | Shaffer |
| 3,628,934 | A | 12/1971 | Duthoit |
| 3,652,244 | A | 3/1972 | Plumat |
| 3,799,817 | A | 3/1974 | Van Laethem |
| 3,822,122 | A * | 7/1974 | Plumat et al. .... B32B 17/10137 65/30.14 |
| 4,571,446 | A | 2/1986 | Yamazaki |
| 4,671,814 | A | 6/1987 | Aratani et al. |
| 6,092,392 | A | 7/2000 | Verlinden et al. |
| 7,666,511 | B2 | 2/2010 | Ellison et al. |
| 8,158,543 | B2 | 4/2012 | Dejneka et al. |
| 8,431,502 | B2 | 4/2013 | Dejneka et al. |
| 8,586,492 | B2 | 11/2013 | Barefoot et al. |
| 8,720,226 | B2 | 5/2014 | Allan et al. |
| 8,776,547 | B2 | 7/2014 | Abramov et al. |
| 8,802,581 | B2 | 8/2014 | Dejneka et al. |
| 8,951,927 | B2 | 2/2015 | Dejneka et al. |
| 8,969,226 | B2 | 3/2015 | Dejneka et al. |
| 9,156,724 | B2 | 10/2015 | Gross |
| 9,156,726 | B2 | 10/2015 | Katayama et al. |
| 9,290,413 | B2 | 3/2016 | Dejneka et al. |
| 9,302,937 | B2 | 4/2016 | Gulati et al. |
| 9,851,927 | B2 | 12/2017 | Hasegawa et al. |
| 2004/0069770 | A1 * | 4/2004 | Cary ........................ B32B 15/04 219/522 |
| 2006/0127679 | A1 | 6/2006 | Gulati et al. |
| 2009/0197048 | A1 | 8/2009 | Amin et al. |
| 2009/0197088 | A1 | 8/2009 | Murata |
| 2009/0202808 | A1 | 8/2009 | Glaesemann et al. |
| 2009/0220761 | A1 | 9/2009 | Dejneka et al. |
| 2010/0035038 | A1 | 2/2010 | Barefoot et al. |
| 2010/0047521 | A1 | 2/2010 | Amin et al. |
| 2010/0087307 | A1 | 4/2010 | Murata et al. |
| 2010/0192634 | A1 | 8/2010 | Higuchi et al. |
| 2010/0291353 | A1 * | 11/2010 | Dejneka ............. C03B 33/0222 428/192 |
| 2011/0092353 | A1 | 4/2011 | Amin et al. |
| 2011/0165393 | A1 | 7/2011 | Bayne et al. |
| 2011/0281093 | A1 | 11/2011 | Gulati et al. |
| 2011/0300908 | A1 | 12/2011 | Grespan et al. |
| 2012/0052302 | A1 | 3/2012 | Matusick et al. |
| 2012/0135226 | A1 | 5/2012 | Bookbinder et al. |
| 2012/0236477 | A1 | 9/2012 | Weber |
| 2013/0127202 | A1 | 5/2013 | Hart |
| 2013/0134202 | A1 | 5/2013 | Garner et al. |
| 2013/0224491 | A1 | 8/2013 | Smedskjaer et al. |
| 2013/0224492 | A1 | 8/2013 | Bookbinder et al. |
| 2014/0087159 | A1 | 3/2014 | Cleary et al. |
| 2014/0106172 | A1 | 4/2014 | Dejneka et al. |
| 2014/0162036 | A1 * | 6/2014 | Marcellus ............. B32B 17/061 428/215 |
| 2016/0016849 | A1 | 1/2016 | Allan |
| 2018/0251400 | A1 | 9/2018 | Bookbinder et al. |
| 2018/0370852 | A1 | 12/2018 | Navet et al. |

FOREIGN PATENT DOCUMENTS

| | | |
|---|---|---|
| JP | 56041859 | 4/1981 |
| JP | 06138427 | 5/1994 |
| JP | 2002174810 A | 6/2002 |
| JP | 2003089551 A | 3/2003 |
| WO | 2018135548 A1 | 7/2018 |

OTHER PUBLICATIONS

European Patent Office; International Search Report and Written Opinion for International Application No. PCT/US2014/060241; dated May 29, 2015; pp. 1-23.

Varshneya et al.; "Influence of Externally Applied Stresses on Kinetics of Ion Exchange in Glass"; Journal of the American Ceramic Society, 68, No. 7 (Jul. 1985); pp. C-165-C166.

* cited by examiner

US 10,273,184 B2

ION EXCHANGE PROCESSES AND CHEMICALLY STRENGTHENED GLASS SUBSTRATES RESULTING THEREFROM

PRIORITY

This application claims the benefit of priority under 35 U.S.C. § 119 of U.S. Provisional Application Ser. No. 61/890,530 filed on Oct. 14, 2013, the content of which is relied upon and incorporated herein by reference in its entirety.

BACKGROUND

Field

This invention generally relates to the field of flexible glass, and in particular to the production of chemically-strengthened thin, flexible glass substrates having high mechanical reliability.

Technical Background

One approach to minimizing the defect level in thin, flexible glass sheets or ribbons to achieve mechanical reliability relies on the glass not incurring additional damage or defects throughout its lifetime that would limit strength. Because of this, flexible glass substrates in this situation may not be able to be used as an outer surface. Recently, the lamination of flexible glass to polymer and metal substrates has been demonstrated. Situations may exist, though, where lamination to a thick polymer or metal substrate is not compatible with the overall application requirements. Additional situations may exist where an increased compressive stress at the surface is required. There is an interest in the ability to increase the surface strength of flexible glass substrates in new and alternative ways to meet emerging application needs.

SUMMARY

One way to increase the strength and durability of glass substrates is through chemical strengthening of at least one major surface of the glass substrate, for example, by ion exchange processes. One or both of the major surfaces may be chemically strengthened to a depth from the surface of the glass substrate, wherein the strengthened portion associated with the respective major surface is known as a depth of layer (DOL) of chemical strengthening of the major surface.

Once the chemical strengthening process is complete, the glass substrate can include a symmetric stress profile or an asymmetric glass profile. A symmetric stress profile exists when both major surfaces of the glass substrate are symmetrically chemically strengthened with the DOL of the first major surface being substantially equal to the DOL of the second major surface. An asymmetric stress profile exists, for example, when only one of the major surfaces of the glass substrate is chemically strengthened. In another example, an asymmetric stress profile exists when both major surfaces of the glass substrate are asymmetrically chemically strengthened with the DOL of the first major surface being substantially different than the DOL of the second major surface.

Chemical strengthening (e.g., by an ion exchange process) can also be used to produce a DOL of any thickness on one or both major surfaces of the glass substrate. Throughout the specification, the thickness of the DOL refers to the depth of strengthening of the glass substrate below the major surface that is achieved by the chemical strengthening process. The chemical strengthening processes of the disclosure allow targeting of one or both of the major surfaces of the glass substrate to customize the glass substrate for the intended application. In one example, a DOL that is greater than 25% of the average thickness of the glass substrate can be produced on one or both major surface of the glass substrate to produce a symmetric stress profile or an asymmetric stress profile. A symmetric stress profile can provide a flexible glass substrate with equivalent durability on both surfaces. Alternatively, an asymmetric stress profile can provide a flexible glass substrate that has one major surface with enhanced durability relative to the other major surface. The chemically strengthened symmetric and asymmetric glass substrates can be further integrated into laminated structures with polymer, metal, or other substrates including additional glass structures to create more complex stress profiles for increased durability.

In one aspect, a chemically strengthened glass article is disclosed comprising a glass substrate including a first surface and a second surface opposite the first surface, and wherein an average thickness of the glass substrate between the first surface and the second surface is equal to or less than about 0.3 mm; a first compressive stress layer extending inward toward a center of the glass substrate comprising a first depth of layer $DOL_1$; a second compressive stress layer extending inward toward the center of the glass substrate comprising a second depth of layer $DOL_2$; and wherein $DOL_1$ is greater than $DOL_2$. $DOL_1$ can be least 2% greater than $DOL_2$. For example, $DOL_1$ may be at least 6% greater than $DOL_2$, and in some embodiments, $DOL_1$ may be at least 10% greater than $DOL_2$. $DOL_1$ may be equal to or greater than 10 μm. The compressive stress at the first surface of the glass substrate may be at least 500 MPa, whereas the compressive stress at the second surface of the glass substrate is less than the first.

In another aspect, a method for forming a chemically strengthened glass is described comprising: positioning a glass substrate comprising a first surface and a second surface opposite the first surface and having an average thickness between the first and second surfaces equal to or less than 03 mm in a curved configuration, a radius of curvature of the glass substrate in the curved configuration being in a range from about 10 mm to about 300 mm; immersing the glass substrate in the curved configuration in a molten alkali metal salt such that the first and second surfaces are contacted by the molten alkali metal salt to produce a chemically strengthened glass substrate; and wherein the chemically strengthened glass substrate comprises a first compressive stress layer that extends inward from the first surface of the glass substrate to a first depth of layer $DOL_1$, a second compressive stress layer extending inward from the second surface of the glass substrate to a second depth of layer $DOL_2$; and wherein DOL1 is greater than DOL2. $DOL_1$ may be at least 2% greater than $DOL_2$, at least 6% greater than $DOL_2$ or at least 10% greater than $DOL_2$. The compressive stress at the first surface of the chemically strengthened glass substrate can be at least 500 MPa, such as equal to or greater than 950 MPa. The compressive stress at the second surface of the chemically strengthened glass substrate is less than the first. The glass substrate can be fixed in a device that produces the curved configuration of the glass substrate during the immersing. The glass substrate can be a glass ribbon, and the step of immersing may comprise moving the glass ribbon from a supply reel to a take-up reel, and wherein during the step of immersing at least a portion of the moving glass ribbon travels through the bath of molten alkali metal salt. In some embodiments the at least a portion of the moving glass ribbon can be conveyed over a roller within the bath of molten alkali metal salt, wherein the roller imparts a bend radius on the at least a portion of the moving glass ribbon in a range from about 10 mm to about 300 mm, such as in a range from about 20 mm to about 300 mm $DOL_1$ can be equal to or greater than 10 μm.

In still another embodiment, a laminate article is disclosed comprising: a first substrate; a second substrate comprising a first surface and a second surface opposite the first surface, wherein an average thickness of the second substrate between the first surface and the second surface is equal to or less than about 0.3 mm, the second surface being bonded to the first substrate, the second substrate comprising: a glass substrate including; a first compressive stress layer extending inward toward a center of the glass substrate from the first surface comprising a first depth of layer $DOL_1$; a second compressive stress layer extending inward toward the center of the glass substrate from the second surface comprising a second depth of layer $DOL_2$; and wherein $DOL_1$ is greater than $DOL_2$. The glass substrate may include a $DOL_1$ that is at least 10% greater than $DOL_2$. The first substrate can comprise a polymer, metal, or other glass structure. In some embodiments the first substrate comprises metal. $DOL_1$ can be at least 2% greater than $DOL_2$, at least 6% greater than $DOL_2$ or at least 10% greater than $DOL_2$. The compressive stress at the first surface of the second substrate can be equal to or greater than 500 MPa, and in some instances equal to or greater than 950 MPa, whereas the compressive stress at the second surface of the second substrate can be less than the first.

In still another aspect, a method for forming a chemically strengthened glass is disclosed comprising: immersing a glass substrate having an average thickness equal to or less than 0.3 mm in a bath of molten alkali metal salt such that a first surface of the glass substrate is in contact with the molten alkali metal salt and a second surface of the glass substrate is contacted by a mask over the entire second surface to chemically strengthen at least the first surface of the glass substrate; and wherein the chemically strengthened glass sheet comprises a compressive stress layer extending inward from the first surface of the glass substrate that is greater than a compressive stress layer at the second surface. The mask can include at least one of a metal or a carrier substrate, for example. In some embodiments, the compressive stress layer extending inward from the first surface of the glass substrate can be greater than 25% of the average thickness of the glass substrate.

In still another aspect, a chemically strengthened glass article is disclosed comprising a glass substrate including a first surface and a second surface opposite the first surface, and wherein an average thickness of the glass substrate between the first surface and the second surface is equal to or less than about 0.3 mm; a first compressive stress layer extending inward toward a center of the glass substrate comprising a first depth of layer $DOL_1$, and wherein $DOL_1$ is greater than 25% of the average thickness of the glass substrate. The chemically strengthened glass article can further comprise a second compressive stress layer extending inward toward the center of the glass substrate comprising a second depth of layer $DOL_2$. In one example, $DOL_2$ can be greater than 25% of the average thickness of the glass substrate. In another example, $DOL_1$ can be equal to $DOL_2$.

In still another aspect, a method for forming a chemically strengthened glass is described comprising: immersing a glass substrate comprising a first surface, a second surface opposite the first surface and an average thickness between the first and second surfaces equal to or less than 03 mm in a molten alkali metal salt such that the first and second surfaces are contacted by the molten alkali metal salt to produce a chemically strengthened glass substrate; wherein the chemically strengthened glass substrate comprises a first compressive stress layer that extends inward from the first surface of the glass substrate to a first depth of layer $DOL_1$; and wherein $DOL_1$ is greater than 25% of the average thickness of the glass substrate. The chemically strengthened glass article can further comprise a second compressive stress layer extending inward toward the center of the glass substrate comprising a second depth of layer $DOL_2$. In one example, $DOL_2$ can be greater than 25% of the average thickness of the glass substrate. In another example, $DOL_1$ can be equal to $DOL_2$. In some embodiments the glass substrate can be a glass ribbon, and the step of immersing comprises moving the glass ribbon from a supply reel to a take-up reel, and wherein during the step of immersing at least a portion of the moving glass ribbon travels through the molten alkali metal salt.

In still another aspect, a method for forming a chemically strengthened glass is described comprising: positioning a glass substrate comprising a first surface, a second surface opposite the first surface and an average thickness between the first and second surfaces equal to or less than 03 mm in a curved configuration, a radius of curvature of the glass substrate in the curved configuration being in a range from about 10 mm to about 300 mm; immersing the glass substrate in the curved configuration in a molten alkali metal salt such that the first and second surfaces are contacted by the molten alkali metal salt to produce a chemically strengthened glass substrate; wherein the chemically strengthened glass substrate comprises a first compressive stress layer that extends inward from the first surface of the glass substrate to a first depth of layer $DOL_1$; and wherein $DOL_1$ is greater than 25% of the average thickness of the glass substrate. The chemically strengthened glass article can further comprise a second compressive stress layer extending inward toward the center of the glass substrate comprising a second depth of layer $DOL_2$. In one example, $DOL_2$ can be greater than 25% of the average thickness of the glass substrate. In some embodiments, the glass substrate can be fixed in a device that produces the curved configuration of the glass substrate during the immersing. In other embodiments, the glass substrate can be a glass ribbon, and the step of immersing comprises moving the glass ribbon from a supply reel to a take-up reel, and wherein during the step of immersing at least a portion of the moving glass ribbon travels through the molten alkali metal salt. The at least a portion of the moving glass ribbon can travel over a roller within the molten alkali metal salt, and the roller can impart a bend radius on the at least a portion of the moving glass ribbon in a range from about 10 mm to about 300 mm.

In still another embodiment, a laminate article is disclosed comprising: a first substrate and a second substrate. The second substrate comprises a first surface and a second surface opposite the first surface, wherein an average thickness of the second substrate between the first surface and the second surface is equal to or less than about 0.3 mm, the second surface being bonded to the first substrate, the second substrate comprising: a glass substrate including; a first compressive stress layer extending inward toward a center of the glass substrate from the first surface comprising a first depth of layer $DOL_1$; and wherein $DOL_1$ is greater than 25% of the average thickness of the glass substrate. The glass substrate can further comprise a second compressive stress layer extending inward toward the center of the glass substrate comprising a second depth of layer $DOL_2$. In one example, $DOL_2$ can be greater than 25% of the average thickness of the glass substrate. In another example, $DOL_1$ can be equal to $DOL_2$. In still another example of the laminate article, the first substrate can include at least one of a metal and a polymer, or other material.

Additional features and advantages of the embodiments disclosed herein will be set forth in the detailed description which follows, and in part will be readily apparent to those skilled in the art from that description, the claims that follow, as well as the appended drawings, or recognized by practicing the embodiments.

It is to be understood that both the foregoing general description and the following detailed description present embodiments intended to provide an overview or framework for understanding the nature and character of the embodiments. The accompanying drawings are included to provide a further understanding of the embodiments, and are incorporated into and constitute a part of this specification. The drawings, together with the description, serve to explain the principles and operations of the embodiments disclosed herein.

DETAILED DESCRIPTION

Figure 1:
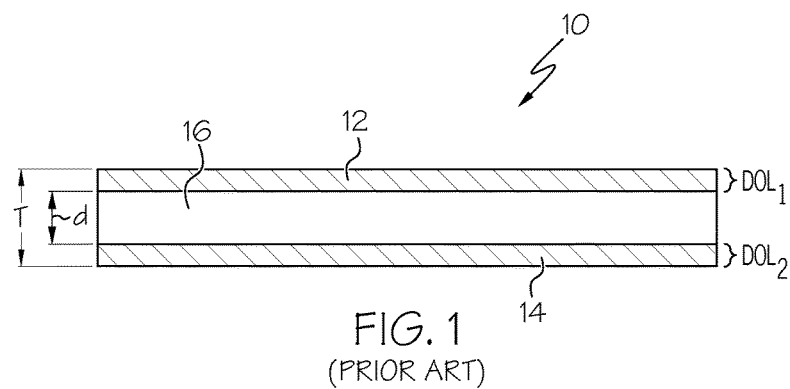
FIG. 1 is a cross sectional view of a conventionally produced chemically strengthened glass substrate having symmetrical depth of layers for the opposing surfaces of the substrate, wherein each depth of layer is illustrated as less than 25% of the thickness of the glass substrate.

Reference will now be made in detail to the various embodiments, examples of which are illustrated in the accompanying drawings. Whenever possible, the same reference numerals will be used throughout the drawings to refer to the same or like parts.

In an ion exchange process for glass, ions in the surface layer of a glass article are replaced by—or exchanged with—larger ions having the same valence or oxidation state as the ions present in the glass. The larger ions are typically monovalent metal cations such as, but not limited to, $Li^+$, $Na^+$, $K^+$, $Rb^+$, $Cs^+$, $Ag^+$, $Tl^+$, $Cu^+$, and the like. The mismatch in ion size generates a compressive stress at the surface of the glass, which inhibits both crack formation and propagation. For the glass to fracture, the applied stress must place the mechanical defect under sufficient tension to propagate existing flaws. If these flaws exist within the ion exchanged depth of layer, the applied stress must first overcome the compressive stress at the surface of the glass. Ion exchange in glass can also be used to vary the optical refractive index.

Ion exchange processes typically comprise immersing a glass or glass ceramic article or substrate in a molten salt bath containing the larger ions to be exchanged with the smaller ions in the glass. Other processes besides use of a bath are possible that bring the glass or glass ceramic article in contact with a molten salt to cause an exchange of ions. In some embodiments, the ion exchange bath comprises, consists essentially of, or consists of at least one alkali metal salt such as, but not limited to, nitrates, sulfates, and halides of sodium and potassium or other alkali metal elements. In some embodiments, the ion exchange bath may also include salts of other monovalent metals (e.g., $Ag^+$, Tl, Cu, or the like). In some embodiments, the ion exchange bath is a eutectic mixture of such salts or a molten solution of one salt in a second salt. One non-limiting example of a molten salt solution is a solution of potassium nitrate in ammonium nitrate.

It will be appreciated by those skilled in the art that parameters for the ion exchange process including, but not limited to, bath composition and temperature, immersion time or interaction time, the number of immersions of the glass in a salt bath (or baths), use of multiple salt baths, additional steps such as annealing, washing, and the like, are generally determined by the composition of the glass, the compressive stress at the surface of the glass and the depth of the compressive layer of the glass or glass ceramic desired to be achieved by the strengthening process. By way of example, ion exchange of alkali metal-containing glasses may be achieved by immersion of the glass article in at least one molten alkali metal salt bath. The temperature of such $KNO_3$ molten salt baths, for example, is typically in a range from about 380° C. up to about 450° C., and immersion times can range from minutes up to about 16 hours. However, temperatures and immersion times that are different from those described herein may also be used. Such ion exchange treatments typically result in strengthened glasses or glass ceramics having an outer surface layer that is under compressive stress (CS).

The compressive stress layer generated by ion exchange typically has a maximum value at the surface of the article and decreases with depth. To maintain a force balance within the article, the compressive stress present at the surface is balanced by tensile stress, referred to herein as central tension (CT), in the center region of the article. The distance between the surface and the location at which the total stress is zero, or changes sign (e.g. changing from compressive stress to tensile stress), is referred to as the depth of layer (DOL). For traditional ion exchange processes that employ a single temperature, time, thickness, and bath concentration, the relationship between these variables is well-defined.

These measures of the ion exchanged stress field may be related to the mechanical performance of the glass article. For example, retained strength after abrasion or handling improves directly with DOL. Compressive stress is purported to control surface flaw behavior, as determined through ring-on-ring or ball drop testing. Low central tension is more desirable for controlling breakage during cutting and for frangibility control.

The ion exchange process can be symmetric, in that the entire glass article, e.g. a glass sheet, is immersed in the molten salt bath, and, for a glass sheet, both surfaces of the glass sheet are equally ion exchanged. The result is a chemically strengthened glass sheet having a compressive stress layer and depth of layer defined at both the major surfaces that is substantially the same on one side of the glass sheet as it is on the other side. FIG. 1 illustrates a glass substrate 10 after being ion-exchanged by such a conventional process. The resultant chemically strengthened glass sheet 10 comprises a first compressive stress layer 12, a second compressive stress layer 14, and a region 16 of tensile stress disposed therebetween. Each compressive stress layer 12 and 14 includes a depth of layer DOL (i.e. $DOL_1$ and $DOL_2$, respectively). In the example of FIG. 1, $DOL_1$ is equal to $DOL_2$, and $DOL_1$ and $DOL_2$ are both illustrated as being less than 25% of the thickness "T" of the glass sheet 10. The compressive stress at the surface of compressive stress layer 12 is equal to the compressive stress at the surface of compressive stress layer 14.

In some applications, such as where both surfaces of the glass sheet may be exposed to physically harsh environments, having both surfaces symmetrically or asymmetrically chemically strengthened can be advantageous. In other applications, it may be desirable to have only one surface of the glass strengthened. In still other applications, it may desirable to control the thickness of the DOL on one or both surfaces of the glass based at least in part on the thickness of the glass sheet. The glass articles that are ion exchanged can be planar substrates or substrates that were previously shaped into 3D contours.

In one example, providing suitable compressive stress at a sufficient depth for the desired strength benefit, in a symmetric fashion, may leave very little of the total thickness of the glass sheet for balancing tensile stress. In another example, applications for very thin glass may not require both surfaces of the glass sheet to be chemically strengthened, or require only that one surface of the glass sheet to be strengthened more than the other surface of the glass sheet. For example, such glass sheets may be used as a cover glass for electronic display devices such as computers, cell phones and tablets, wherein the strengthened glass is affixed to or deployed in front of a display panel and thus only a single surface of the strengthened glass is exposed to the ambient environment. In other instances, the glass sheet may be laminated to other surfaces, such as polymer or metal surfaces of household or office appliances or furniture. In still other instances, only one surface need be ion exchanged or at the least be ion exchanged to a greater degree than the other side, since the opposite surface laminated to the polymer or metal or other substrate material would not be exposed to the external environment. Thus, the present disclosure is directed to methods of producing symmetrically and asymmetrically ion exchanged glass substrates, and the resultant substrates.

Figure 2:
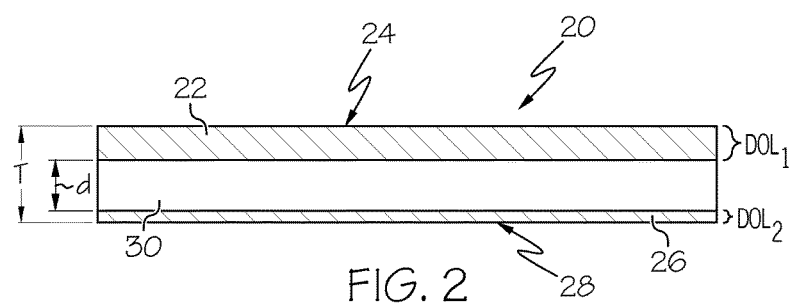
FIG. 2 is a cross sectional view of a glass substrate produced by embodiments disclosed herein and having asymmetric depth of layer for the opposing surfaces of the substrate, wherein one depth of layer is illustrated as greater than 25% of the thickness of the glass substrate and another depth of layer is illustrated as less than 25% of the thickness of the glass substrate.

FIG. 2 illustrates a cross sectional edge view of a glass substrate 20 that has been asymmetrically ion exchanged. Glass substrate 20 comprises a first compressive stress layer 22 extending from a first surface 24 of the glass substrate 20 inward toward the center of the glass substrate. Glass substrate 20 further comprises a second compressive stress layer 26 extending from a second surface 28 of the glass substrate 20 inward toward the center of the glass substrate. A depth of layer is associated with each of the first and second compressive stress layers, i.e. $DOL_1$, and $DOL_2$, respectively. The glass substrate has an overall thickness of "T." As shown, $DOL_1$ is different from $DOL_2$, and as illustrated in FIG. 2, $DOL_1$ is greater than $DOL_2$, wherein $DOL_1$ is illustrated as being greater than 25% of the thickness "T" of the glass substrate 20, and $DOL_2$ is illustrated as being less than 25% of the thickness "T" of the glass substrate 20, thereby producing an asymmetric stress profile in the glass sheet. A tensile region 30 is disposed between the first and second compressive stress layers and accounts for the remaining thickness of the glass substrate. That is, the thickness d of tensile region 30 is $T-(DOL_1+DOL_2)$. For the glass sheet depicted in FIG. 2, surface 24, the surface associated with the greater depth of layer, is the surface that would desirably be exposed to the external environment.

Figure 10:
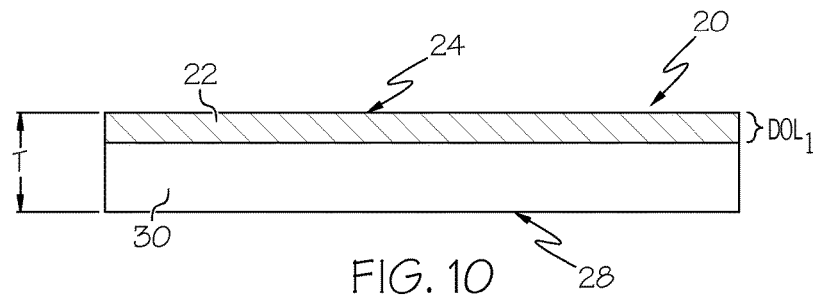
FIG. 10 is a cross sectional view of a glass substrate having a depth of layer on only one surface of the substrate, wherein the depth of layer is illustrated as greater than 25% of the thickness of the glass substrate.

In some embodiments, only one surface, surface 24, may be ion exchanged and $DOL_2$ is zero. This embodiment is illustrated in FIG. 10. As further illustrated in FIG. 10, $DOL_1$ can be greater than 25% of the thickness "T" of the glass substrate 20. As illustrated, DOL1 is 30% of the thickness "T" of the glass substrate 20. In other examples, $DOL_1$ can be in a range 25%<$DOL_1$≤90% (e.g. 26%, 30%, 35%, 40%, 45%, 50%, 60%, 70%, 80%, 90%) of the thickness "T" of the glass substrate 20. As noted, in some examples, the substrate can have a thickness equal to or less than 0.3 mm, equal to or less than about 0.2 mm, equal to or less than 0.1 mm, or equal to or less than 0.05 mm. Additionally, the substrate can be made of multiple layers of differing composition where the outer layer on at least one substrate surface is ion exchangeable.

Figure 11:
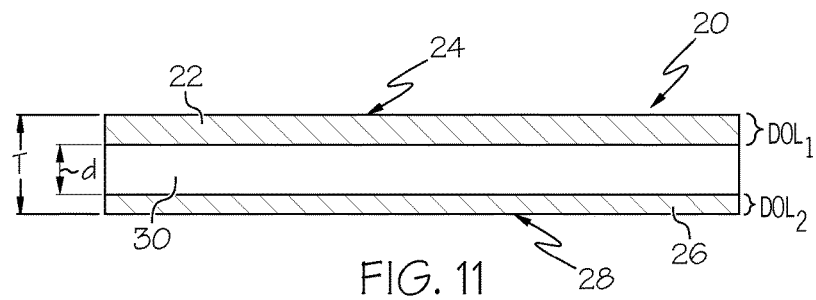
FIG. 11 is a cross sectional view of a glass substrate having a depth of layer on one surface of the substrate that is illustrated as greater than 25% of the thickness of the glass substrate and a depth of layer on the other surface of the glass substrate that is illustrated as less than 25% of the thickness of the substrate.
Figure 12:
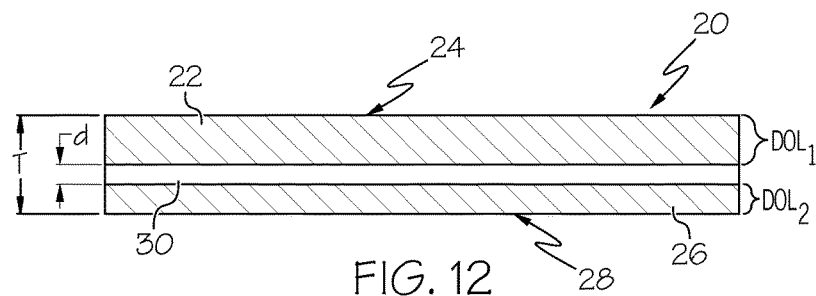
FIG. 12 is a cross sectional view of a glass substrate having asymmetric depth of layers on both surfaces of the glass substrate that are each greater than 25% of the thickness of the glass substrate.

In another example, like the embodiment of FIG. 2, FIG. 11 illustrates wherein the glass substrate 20 can be asymmetrically ion exchanged to produce a $DOL_1$ that is greater than 25% of the thickness "T" of the glass substrate 20 and a $DOL_2$ that is less than 25% of the thickness "T" of the glass substrate 20. In FIG. 11, $DOL_1$ is illustrated as being 30% of the thickness "T" of the glass substrate 20 and $DOL_2$ is illustrated as being 20% of the thickness "T" of glass substrate 20. In yet another example, illustrated in FIG. 12, the glass substrate 20 can be asymmetrically ion exchanged to produce a $DOL_1$ that is greater than 25% of the thickness "T" of the glass substrate 20 and a $DOL_2$ that is also greater than 25% of the thickness "T" of the glass substrate 20. In FIG. 12, $DOL_1$ is illustrated as being 50% of the thickness "T" of glass substrate 20 and $DOL_2$ is illustrated as being 30% of the thickness "T" of glass substrate 20.

Figure 13:
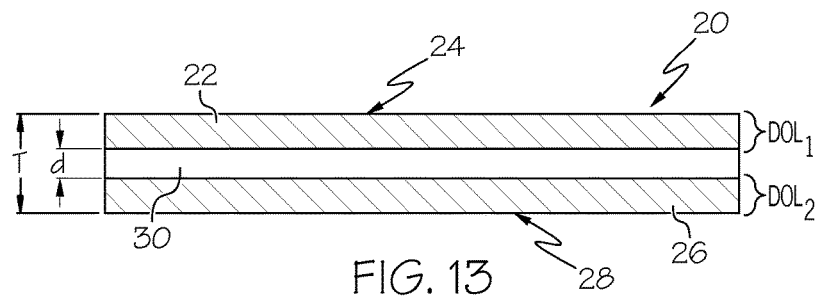
FIG. 13 is a cross sectional view of a glass substrate having symmetric depth of layers on both surfaces of the substrate that are each greater than 25% of the thickness of the glass substrate.

In still another example, illustrated in FIG. 13, the glass substrate 20 can be symmetrically ion exchanged to produce a $DOL_1$ that is equal to a $DOL_2$ wherein each of $DOL_1$ and $DOL_2$ is greater than 25% of the thickness "T" of the glass substrate 20. In FIG. 13, each of $DOL_1$ and $DOL_2$ is illustrated as being 35% of the thickness "T" of the glass substrate 20.

In accordance with embodiments of the present disclosure, glass substrates suitable for ion exchange may comprise an alkali aluminosilicate glass and encompass various glass compositions as listed below. In one such embodiment, the glass is substantially free of lithium. In addition to those listed below, various other alkali aluminosilicate glass compositions may be used as cover glass in accordance with the present disclosure.

In one embodiment, the alkali aluminosilicate glass comprises: at least one of alumina and boron oxide, and at least one of an alkali metal oxide and an alkali earth metal oxide, wherein $-15$ mole $\% \leq (R_2O+R'O-Al_2O_3-ZrO_2)-B_2O_3 \leq 4$ mole %, where R is one of Li, Na, K, Rb, and Cs, and R' is one of Mg, Ca, Sr, and Ba. In some embodiments, the alkali aluminosilicate glass comprises: from about 62 mole % to about 70 mole % $SiO_2$; from 0 mole % to about 18 mole % $Al_2O_3$; from 0 mole % to about 10 mole % $B_2O_3$; from 0 mole % to about 15 mole % $Li_2O$; from 0 mole % to about 20 mole % $Na_2O$; from 0 mole % to about 18 mole % $K_2O$; from 0 mole % to about 17 mole % MgO; from 0 mole % to about 18 mole % CaO; and from 0 mole % to about 5 mole % $ZrO_2$. The glass is described in U.S. patent application Ser. No. 12/277,573 by Matthew J. Dejneka et al., entitled "Glasses Having Improved Toughness and Scratch Resistance," filed Nov. 25, 2008, and claiming priority to U.S. Provisional Patent Application No. 61/004,677, filed on Nov. 29, 2007, the contents of which are incorporated herein by reference in their entirety.

In another embodiment, the alkali aluminosilicate glass comprises: from about 60 mole % to about 70 mole % $SiO_2$; from about 6 mole % to about 14 mole % $Al_2O_3$; from 0 mole % to about 15 mole % $B_2O_3$; from 0 mole % to about 15 mole % $Li_2O$; from 0 mole % to about 20 mole % $Na_2O$; from 0 mole % to about 10 mole % $K_2O$; from 0 mole % to about 8 mole % MgO; from 0 mole % to about 10 mole % CaO; from 0 mole % to about 5 mole % $ZrO_2$; from 0 mole % to about 1 mole % $SnO_2$; from 0 mole % to about 1 mole % $CeO_2$; less than about 50 ppm $As_2O_3$; and less than about 50 ppm $Sb_2O_3$; wherein 12 mole %$\leq Li_2O+Na_2O+K_2O \leq 20$ mole % and 0 mole %$\leq MgO+CaO \leq 10$ mole %. The glass is described in U.S. Pat. No. 8,158,543 by Sinue Gomez et al., entitled "Fining Agents for Silicate Glasses," issued on Apr. 17, 2012, and claiming priority to U.S. Provisional Patent Application No. 61/067,130, filed on Feb. 26, 2008, the contents of which are incorporated herein by reference in their entirety.

In another embodiment, the alkali aluminosilicate glass has a seed concentration of less than about 1 seed/cm³ and comprises: 60-72 mole % $SiO_2$; 6-14 mole % $Al_2O_3$; 0-15 mole % $B_2O_3$; 0-1 mole % $Li_2O$; 0-20 mole % $Na_2O$; 0-10 mole % $K_2O$; 0-2.5 mole % CaO; 0-5 mole % $ZrO_2$; 0-1 mole % $SnO_2$; and 0-1 mole % $CeO_2$, wherein 12 mole %$\leq Li_2O+Na_2O+K_2O \leq 20$ mole %, and wherein the silicate glass comprises less than 50 ppm $As_2O_3$. In other embodiments, the silicate glass comprises: 60-72 mole % $SiO_2$; 6-14 mole % $Al_2O_3$; 0.63-15 mole % $B_2O_3$; 0-1 mole % $Li_2O$; 0-20 mole % $Na_2O$; 0-10 mole % $K_2O$; 0-10 mole % CaO; 0-5 mole % $ZrO_2$; 0-1 mole % $SnO_2$; and 0-1 mole % $CeO_2$, wherein 12 mole %$\leq Li_2O+Na_2O+K_2O \leq 20$ mole %. In further embodiments, the silicate glass comprises: 60-72 mole % $SiO_2$; 6-14 mole % $Al_2O_3$; 0-15 mole % $B_2O_3$; 0-1 mole % $Li_2O$; 0-20 mole % $Na_2O$; 0-10 mole % $K_2O$; 0-10 mole % CaO; 0-5 mole % $ZrO_2$; 0-1 mole % $SnO_2$; and 0-1 mole % $CeO_2$, wherein 12 mole %$\leq Li_2O+Na_2O+K_2O \leq 20$ mole %, wherein 0.1 mole %$\leq SnO_2+CeO_2 \leq 2$ mole %, and wherein the silicate glass is formed from batch or raw materials that include at least one oxidizer fining agent. The glass is described in U.S. Pat. No. 8,431,502 by Sinue Gomez et al., entitled "Silicate Glasses Having Low Seed Concentration," issued on Apr. 30, 2013, and claiming priority to U.S. Provisional Patent Application No. 61/067,130, filed on Feb. 26, 2008, the contents of which are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), and wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mole % $SiO_2$; from about 7 mol % to about 15 mole % $Al_2O_3$; from 0 mole % to about 12 mole % $B_2O_3$; from about 9 mol % to about 21 mole % $Na_2O$; from 0 mol % to about 4 mole % $K_2O$; from 0 mole % to about 7 mole % MgO; and 0 mole % to about 3 mole % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In another embodiment, the alkali aluminosilicate glass comprises at least 50 mole % $SiO_2$ and at least one modifier selected from the group consisting of alkali metal oxides and alkaline earth metal oxides, wherein $[(Al_2O_3 \text{ (mole %)}+B_2O_3 \text{ (mole %)})/(\Sigma \text{ alkali metal modifiers (mole %)})]>1$. In some embodiments, the alkali aluminosilicate glass comprises: from 50 mole % to about 72 mole % $SiO_2$; from about 9 mole % to about 17 mole % $Al_2O_3$; from about 2 mole % to about 12 mole % $B_2O_3$; from about 8 mole % to about 16 mole % $Na_2O$; and from 0 mole % to about 4 mole % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5$ (mole %)$+R_2O$ (mole %))/$M_2O_3$ (mole %)$] \leq 1.2$, where $M_2O_3 = Al_2O_3 + B_2O_3$. In some embodiments, the alkali aluminosilicate glass comprises: from about 40 mole % to about 70 mole % $SiO_2$; from 0 mole % to about 28 mole % $B_2O_3$; from 0 mole % to about 28 mole % $Al_2O_3$; from about 1 mole % to about 14 mole % $P_2O_5$; and from about 12 mole % to about 16 mole % $R_2O$; and, in certain embodiments, from about 40 to about 64 mole % $SiO_2$; from 0 mole % to about 8 mole % $B_2O_3$; from about 16 mole to about 28 mole % $Al_2O_3$; from about 2 mole % to about 12% $P_2O_5$; and from about 12 mole % to about 16 mole % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mole % $P_2O_5$, wherein ($M_2O_3$ (mole %)/$R_xO$ (mole %))<1, wherein $M_2O_3 = Al_2O_3 + B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mole % $B_2O_3$. The glass is described in U.S. patent application Ser. No. 13/678,013 by Timothy M. Gross, entitled "Ion Exchangeable Glass with High Crack Initiation Threshold," filed Nov. 15, 2012, and claiming priority to U.S. Provisional Patent Application No. 61/560,434 filed Nov. 16, 2011, the contents of which are incorporated herein by reference in their entirety.

In other embodiments, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340 + 27.1 \cdot Al_2O_3 - 28.7 \cdot B_2O_3 + 15.6 \cdot Na_2O - 61.4 \cdot K_2O + 8.1 \cdot (MgO + ZnO) \geq 0$ mole %. In particular embodiments, the glass comprises: from about 7 mole % to about 26 mol % $Al_2O_3$; from 0 mol % to about 9 mole % $B_2O_3$; from about 11 mole % to about 25 mole % $Na_2O$; from 0 mole % to about 2.5 mole % $K_2O$; from 0 mole % to about 8.5 mole % MgO; and from 0 mole % to about 1.5 mole % CaO. The glass is described in U.S. patent application Ser. No. 13/533,298, by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011, the contents of which are incorporated herein by reference in their entirety.

In some embodiments, the glass comprises: at least about 50 mole % $SiO_2$; at least about 10 mole % $R_2O$, wherein $R_2O$ comprises $Na_2O$; $Al_2O_3$; and $B_2O_3$, wherein $B_2O_3$—($R_2O$—$Al_2O_3$)$\geq 3$ mole %. In certain embodiments, the glass comprises: at least about 50 mole % $SiO_2$; from about 9 mole % to about 22 mole % $Al_2O_3$; from about 3 mole % to about 10 mole % $B_2O_3$; from about 9 mole % to about 20 mole % $Na_2O$; from 0 mole % to about 5 mole % $K_2O$; at least about 0.1 mole % MgO, ZnO, or combinations thereof, wherein $0 \leq MgO \leq 6$ and $0 \leq ZnO \leq 6$ mole %; and, optionally, at least one of CaO, BaO, and SrO, wherein 0 mole %$\leq$CaO+SrO+BaO$\leq 2$ mole %. When ion exchanged, the glass, in some embodiments, has a Vickers crack initiation threshold of at least about 10 kgf. Such glasses are described in U.S. patent application Ser. No. 13/903,433, by Matthew J. Dejneka et al., entitled "Zircon Compatible, Ion Exchangeable Glass with High Damage Resistance," filed May 28, 2013, and claiming priority to U.S. Provisional Patent Application No. 61/653,489, filed May 31, 2012, the contents of which are incorporated by reference herein in their entirety.

In some embodiments, the glass comprises: at least about 50 mole % $SiO_2$; at least about 10 mole % $R_2O$, wherein $R_2O$ comprises $Na_2O$; $Al_2O_3$, wherein $-0.5$ mole %$\leq Al_2O_3$ (mole %)$-R_2O$ (mole %)$\leq 2$ mole %; and $B_2O_3$, and wherein $B_2O_3$ (mole %)$-(R_2O$ (mole %)$-Al_2O_3$ (mole %))$\geq 4.5$ mole %. In other embodiments, the glass has a zircon breakdown temperature that is equal to the temperature at which the glass has a viscosity of greater than about 40 kPoise and comprises: at least about 50 mole % $SiO_2$; at least about 10 mole % $R_2O$, wherein $R_2O$ comprises $Na_2O$; $Al_2O_3$; and $B_2O_3$, wherein $B_2O_3$ (mole %)$-(R_2O$ (mole %)$-Al_2O_3$ (mole %))$\geq 4.5$ mole %. In still other embodiments, the glass is ion exchanged, has a Vickers crack initiation threshold of at least about 30 kgf, and comprises: at least about 50 mole % $SiO_2$; at least about 10 mole % $R_2O$, wherein $R_2O$ comprises $Na_2O$; $Al_2O_3$, wherein $-0.5$ mole %$\leq Al_2O_3$ (mole %)$-R_2O$ (mole %)$\leq 2$ mole %; and $B_2O_3$, wherein $B_2O_3$ (mole %)$-(R_2O$ (mole %)$-Al_2O_3$ (mole %))$\geq 4.5$ mole %. Such glasses are described in U.S. patent application Ser. No. 13/903,398 by Matthew J. Dejneka et al., entitled "Zircon Compatible, Ion Exchangeable Glass with High Damage Resistance," filed May 28, 2013, and claiming priority to U.S. Provisional Patent Application No. 61/653,485, filed May 31, 2012, the contents of which are incorporated by reference herein in their entirety.

In some embodiments, the alkali aluminosilicate glasses described hereinabove are substantially free of (i.e., contain 0 mole %) of at least one of lithium, boron, barium, strontium, bismuth, antimony, and arsenic. Moreover, in many embodiments the aluminosilicate glass composition may comprise $\geq 12$ mole % $Na_2O$.

Formation of the compressive stress layers can be accomplished by contacting the glass substrate with the previously described molten salt bath by dipping, immersing, spraying, or the like, during which smaller cations in the outer or exterior region of the glass substrate are replaced by, or exchanged with, larger cations of the same valence (usually $1^+$) from the molten salt bath to place the outer or exterior region under compression, while an interior region of the glass (in which no ion exchange occurs) is put under tension. Other methods of bringing a substrate surface in contact with a molten salt to produce an exchange of ions are also possible. Conditions such as contacting time, molten salt temperature, and salt concentration in the molten salt bath can be tailored to achieve a desired DOL and CS in the compressive stress layer (the exterior region in which the ion exchange occurs).

By way of example, one implementation of a method where the compressive stress layer is formed entails immersing the glass substrate into a $KNO_3$-containing molten salt bath at a temperature of about 380 degrees Celsius (° C.) to about 460° C. for a time period in a range from about 30 minutes to about 24 hours to impart the compressive stress via ion exchange. In such implementations, the $KNO_3$-containing molten salt bath can be formed entirely of $KNO_3$; the $KNO_3$-containing molten salt bath can include $KNO_3$ as the only active component that undergoes ion exchange, as well as additional components that are inactive in the ion exchange process but aid, for example, in molten salt bath stability, pH control, viscosity control, or the like; or the KNO$_3$-containing molten salt bath can include KNO$_3$ and a second or other active component that undergoes ion exchange, and it can optionally include additional components that are inactive in the ion exchange process but aid, for example, in molten salt bath stability, pH control, viscosity control, or the like.

Figure 3:
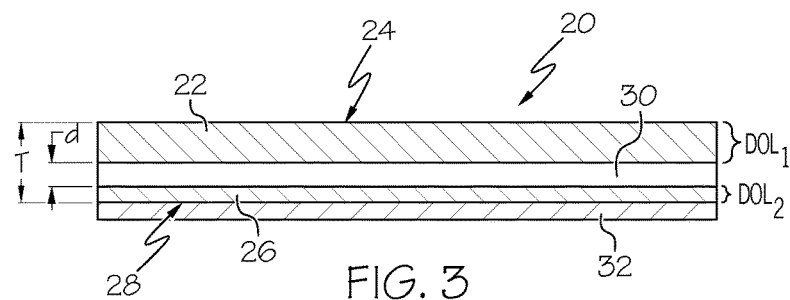
FIG. 3 is a side view of a glass substrate in contact with a mask, wherein one depth of layer is illustrated as greater than 25% of the thickness of the glass substrate and another depth of layer is illustrated as less than 25% of the thickness of the glass substrate.

It should be apparent from the foregoing that the chemistry and process variables of the ion exchange processes will be dictated by the glass composition and by the degree of strengthening needed. More important is the manner in which symmetric and asymmetric ion exchange is achieved. In some embodiments, as illustrated in FIG. 3, a masking material 32 ("mask") may be applied to one surface of the glass sheet, e.g. second surface 28. The masking material may be a metal film, such as an aluminum film that is vapor deposited onto the glass sheet and which is bonded to and covers the entire surface of the glass sheet. The mask prevents or, depending on material and manner of contact, reduces interaction between second surface 28 of the glass sheet and the molten metal bath, and results in first surface 24 of the glass sheet being an ion exchanged surface while second surface 28 of the glass sheet is ion exchanged to a lesser degree that first surface 24, or not at all. In other embodiments, a surface of the glass sheet may be contacted by but not bonded to the masking material. For example, second surface 28 may be placed in contact with but not bonded or in proximity to a plate, such as a metal plate, that impedes contact between the contacted surface and the molten metal bath. Such an arrangement results in a reduced depth of layer DOL$_2$ at contacted surface 28 when compared to the depth of layer DOL$_1$ at the non-contacted surface. Besides a metal plate, this can also be achieved by a roller or arc surface in proximity contact to surface 28. In another example, the glass sheet can be temporarily bonded to a material, such as a carrier, that acts like a mask. While the substrate is temporarily bonded to the carrier, ion exchange to the second surface can be substantially reduced or inhibited. After the ion exchange process is performed, the glass sheet can be debonded from the carrier.

Figure 4:
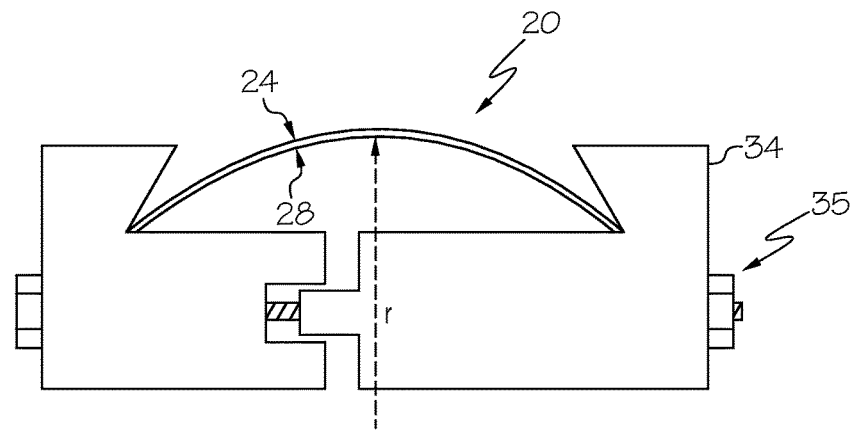
FIG. 4 is a side view of a glass substrate positioned within a jig that imparts a curvature on the glass substrate, the jig and glass substrate being immersible in a molten salt bath.

Referring to FIG. 4, in still another embodiment, the glass substrate 20 that has a substantially planar natural shape may be placed in a curved configuration comprising a radius of curvature r during the period in which the glass sheet is in contact with the molten metal bath. Suitable radii of curvature can be in a range from about 10 mm to about 40 mm, for example in a range from about 20 mm to about 40 mm, depending on the degree of difference between DOL is desired. Other radii may be used as needed. As used herein, the natural shape of a glass sheet is intended to mean the shape of the glass sheet without the intentional application of external forces that would change the shape of the glass sheet.

The curvature of the glass sheet induces a compressive stress at one surface and a tensile stress at the opposite surface. In respect of FIG. 4, first surface 24 is a convex surface and includes the tensile stress, while second surface 28 is a concave surface that includes the compressive stress. The stiffness of the glass sheet, i.e. the force required to bend it, is dependent on the thickness to the third power, but the bend stress that is created in the glass sheet by the bending is linearly dependent on the glass thickness. As the glass thickness is reduced, it requires much less force to bend it and create a given bend stress.

The different stresses induced by bending control the degree to which the ion exchange process can proceed, where compressive stress impedes the progress of the ion exchange and tensile stress can increase the ion exchange rate. The different rates of ion exchange produced by the tensile stress and the compressive stress result in an asymmetric depth of layer between first surface 24 and second surface 28. The curvature can be controlled, for example, by controlling the radius of curvature, for example by installing the glass sheet in a device, such as jig 34 depicted in FIG. 4, that maintains the curved configuration of the glass sheet during exposure of the glass sheet to the molten metal bath, either during the entire exposure period, or a portion thereof, depending on the desired stress profile and depth of layer. As shown in FIG. 4, the jig can be designed so that the radius of curvature of the substrate can be varied with an adjustment screw assembly 35 or similar mechanical methods as are known in the art. The use of a masking layer to control the asymmetry of the exchange process can also be combined with the use of bend stress. As an example, a bend radius of 300 mm or more can be used in combination with a masking layer to provide a preferred bend direction of the resulting asymmetrically exchanged object.

In one example, a sodium aluminosilicate glass sheet (Corning® code 2319 glass) was redrawn to a 100 μm thickness. The 100 μm thick glass sheet was laser cut into 50 mm×50 mm pieces. The cut pieces were then ion exchanged in a molten KNO$_3$ bath placed in a furnace. Parameters of bend radius, ion exchange time, and furnace temperature were varied to identify the influence on the ion exchange process. During the evaluation, the cut pieces were ion exchanged in either a naturally occurring flat, generally stress free state, or by placing the cut pieces in jig 34 with a bend radius in a range from 20 mm to 40 mm and immersing the jig and the cut piece of glass substrate in the molten KNO$_3$ bath. The furnace temperature was varied over three temperatures, i.e. 380° C., 410° C., and 440° C. The ion exchange times varied from 1 hour to 1.5 hours. The resulting DOL and CS of the ion exchanged samples were measured using a commercially available instrument for measuring surface stress, a FSM-6000, manufactured by Luceo Co., Ltd. (Tokyo, Japan).

Figure 5:
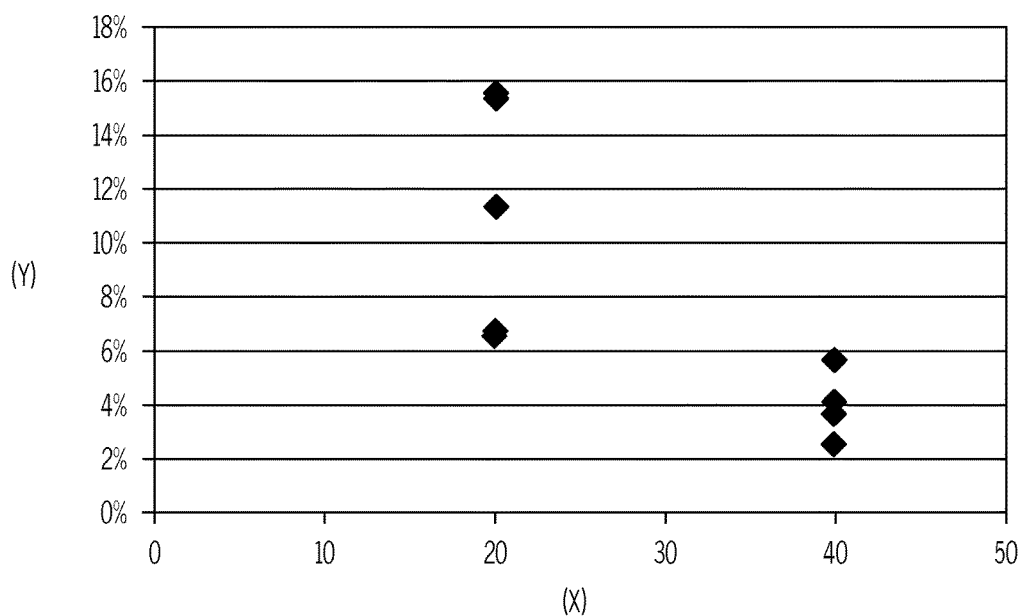
FIG. 5 is a graph showing the percent difference between the compressive stress at a surface of a glass substrate where the surface had a convex surface during an ion exchange process and the compressive stress at the opposite surface that had a concave curvature during the ion exchange process.
Figure 6:
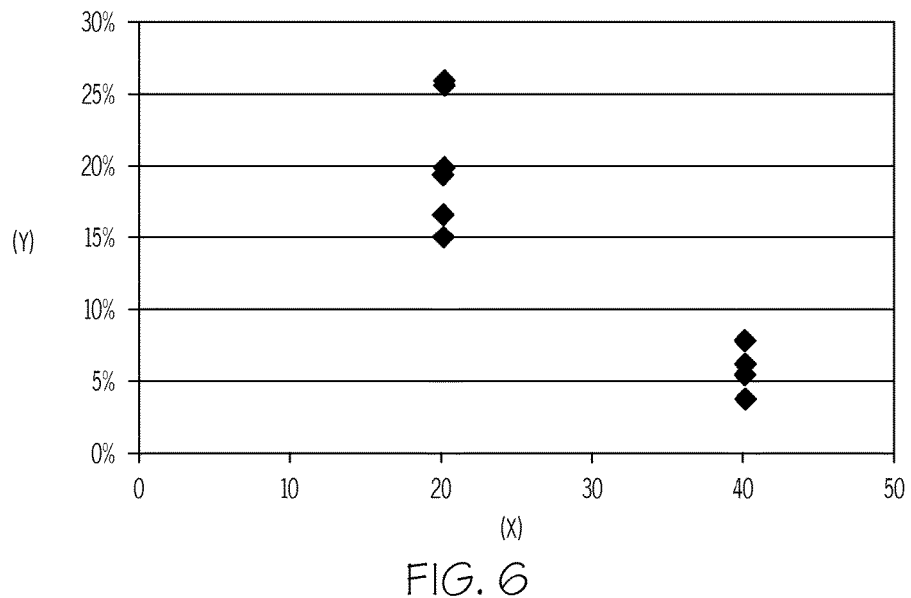
FIG. 6 is a graph showing the percent difference between the depth of layer at a surface of a glass substrate where the surface had a convex surface during an ion exchange process and the depth of layer at the opposite surface that had a concave curvature during the ion exchange process.

FIGS. 5 and 6 show how the bend shape of the cut glass samples affected the ion exchange processes. In this case, the percent difference in CS is plotted in FIG. 5 with the horizontal axis (X) representing bend radius (mm) and the vertical axis (Y) representing percent difference in compressive stress (convex v. concave). Additionally, the percent difference in DOL is plotted in FIG. 6 with the horizontal axis (X) representing bend radius (mm) and the vertical axis (Y) representing percent difference in depth of layer (convex v. concave). The percent difference in CS and DOL show the increase of CS and DOL on the convex (tensile) side of the bent glass substrate vs. the inner concave (compressive) side. The data show that the curved glass, with corresponding induced bend stress, can control the level of ion exchange that occurs. Differences in CS greater than 10% and difference in DOL greater than 20% were achieved, confirming that asymmetric ion exchange can be obtained and controlled through bend stress.

Figure 7:
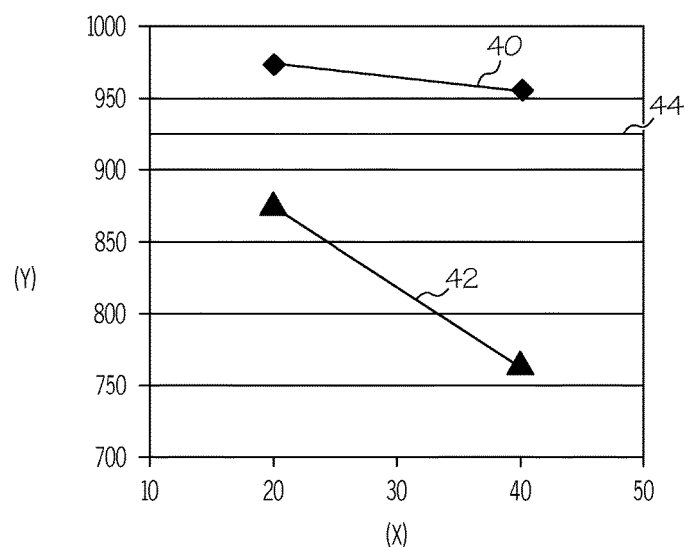
FIG. 7 is a graph showing the compressive stress at the surfaces of a glass substrate that was ion exchanged in a curved configuration and compared to a glass substrate that was maintained in a flat configuration during the ion exchange process.

FIG. 7 shows the actual compressive stress values for the convex (line 40) and concave (line 42) surfaces of the 100 μm thick ion exchanged samples compared to a reference sample (line 44) that was kept flat. The horizontal axis (X) represents bend radius (mm) and the vertical axis represents compressive stress (MPa). These samples were ion exchanged for 1.5 hours at a temperature of 380° C. The data show that the convex surface of the glass not only achieved a compressive stress value higher than the concave surface, but that the low-stress convex side also has a higher compressive stress than the reference flat sample. Correspondingly, the concave surface has a reduced compressive stress value as compared to the reference. This is true for both the glass parts curved at a 20 mm radius of curvature as well as at a 40 mm radius of curvature. The data further indicate that not only can an asymmetric stress profile be generated, but that the speed of the ion exchange process can be substantially increased by utilizing bend stress.

In another example, a sodium aluminosilicate glass sheet (Corning® code 2319 glass) was redrawn to a 50 μm thickness. The 50 μm thick glass sheet was cut into 100 mm×20 mm pieces using a laser to reduce defects along the edge of the glass sheet that can otherwise occur as a result of mechanical cutting. Various samples, including asymmetric ion-exchanged samples, samples with no ion-exchanged surfaces, and symmetrical ion-exchanged samples were produced. Each sample was then subjected to a two-point bend strength test under a constant velocity of 10 mm/s. The asymmetric samples included a center region on one surface of the glass sheet that was masked using a 75 nm aluminum coating to prevent an area approximately 30 mm in length from being ion exchanged on the one surface. To limit the degree of curl in the sheet, the end regions adjacent to the center region were not masked. The sheet was ion-exchanged at 420° C. for 1 hour. Each end of the sheet had symmetrical ion-exchanged surfaces having a depth of layer of approximately 15 μm (e.g. 30% of the thickness of the glass sheet). The center region had an ion-exchanged DOL of approximately 15 μm (e.g. 30% of the thickness of the glass sheet) on one surface and no DOL on the masked surface. The ion-exchanged surfaces had a compressive stress of approximately 850 MPa. Still further, two types of symmetric samples were produced. Symmetric samples of one type were ion-exchanged for 1 hour to produce symmetrical depth of layers of approximately 15 μm (e.g. 30% of the thickness of the glass sheet) on both surfaces of the glass sheet. Symmetric samples of another type were ion-exchanged for less time to produce symmetrical depth of layers below 9 μm (e.g. 5-7 μm) on both surfaces of the glass sheet. The strength distribution versus failure probability was compared among all the ion-exchanged surfaces and all the non-ion exchanged surfaces of the various samples. With respect to the ion-exchanged surfaces, it was observed that these surfaces (irrespective of whether the glass sheet was ion-exchanged in a symmetrical or asymmetrical manner) exhibited comparable strength distributions of approximately 1000 MPa at a 10% failure probability. Similarly, with respect to the surfaces that were not ion-exchanged, it was observed that these surfaces (irrespective of whether the glass sheet was not-ion exchanged or the surface was masked) also exhibited comparable strength distributions in a range of 300-600 MPa at a 10% failure probability.

Figure 14:
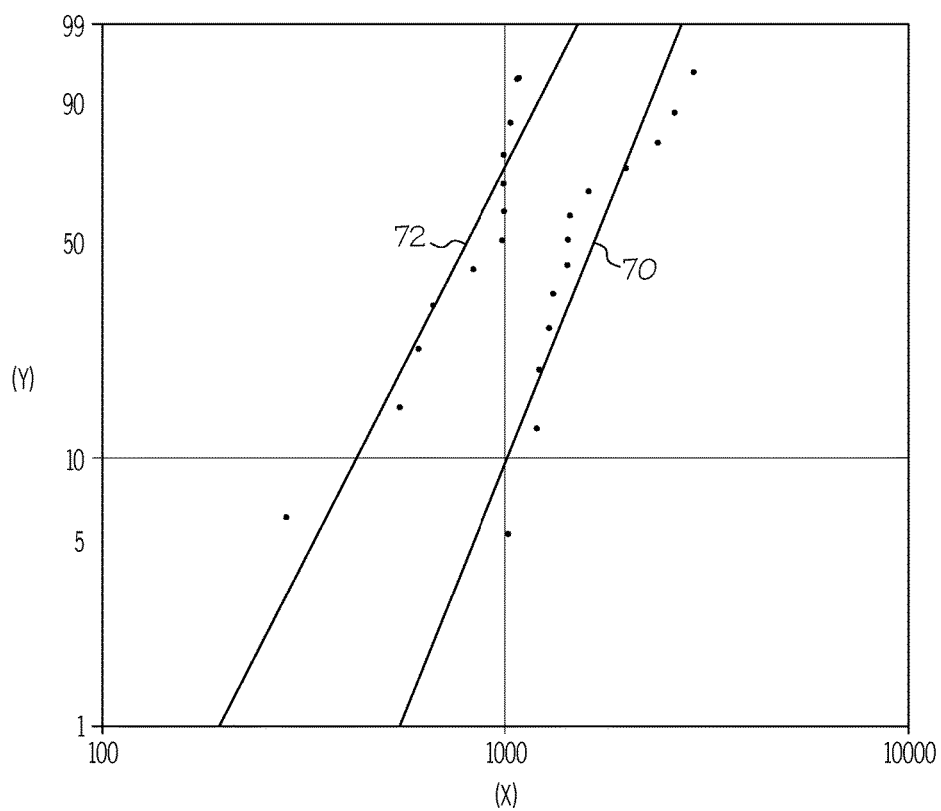
FIG. 14 is a graph showing the strength of ion-exchanged surfaces compared to the strength of non-ion-exchanged or masked surfaces of asymmetrical glass sheets at given failure probabilities.

In a further comparison, shown in FIG. 14, the strengths of the ion-exchanged surfaces of the asymmetrical samples were compared to the strengths of the surfaces that were masked with an aluminum coating (e.g. not ion-exchanged). In FIG. 14, the horizontal axis (X) represents strength (MPa) and the vertical axis (Y) represents failure probability (%). As shown in the plot, the line fit to the data points corresponding to the ion-exchanged surface 70 illustrates a higher strength than the line fit to the data points corresponding to the non-ion-exchanged or masked surface 72 for comparable failure probabilities. For example, at a failure probability of 10%, the non-ion exchanged surface has an average strength less than 500 MPa, while the ion-exchanged surface has an average strength greater than 1000 MPa. This shows that, in one example, the strength of the ion-exchanged surface can be two times that of the non-ion-exchanged surface. In other examples, the strength of the ion-exchanged surface can be any value greater than the strength of the non-ion-exchanged surface (e.g. 2, 5, or 10 times greater).

It can be concluded that meaningful DOL and CS values in glass substrates with reduced thickness can be achieved. If the ion exchange conditions are limited by CT and frangibility, the transfer of previously "unused" DOL and CS from the backside surface to the surface where increased durability is required can be used to maximize protection for very thin, flexible glass substrates. In this way, greater DOL on a single side of an asymmetrically ion exchanged glass object can be larger than is achievable in a symmetrically exchanged object. Moreover, methods used to create an asymmetric ion exchange profile can achieve a desired DOL faster on one surface than can be achieved in using a symmetrical approach. Since ions are not being exchanged on the surface that does not require them, the salt bath typically used for the ion exchange process can have an extended lifetime before replacement. Additionally, the reduced stiffness of glass substrates having a thickness equal to or less than 03 mm may produce a tendency in the glass substrate to bend and deflect in non-predetermined patterns. In some applications such as encapsulating layers, there is a desire to have the substrate deflect in a predictable and predetermined manner. Creating an asymmetric ion exchange profile can be used to produce a preferred bend state in the flexible glass substrate useful in predicting and controlling stress patterns.

Figure 8:
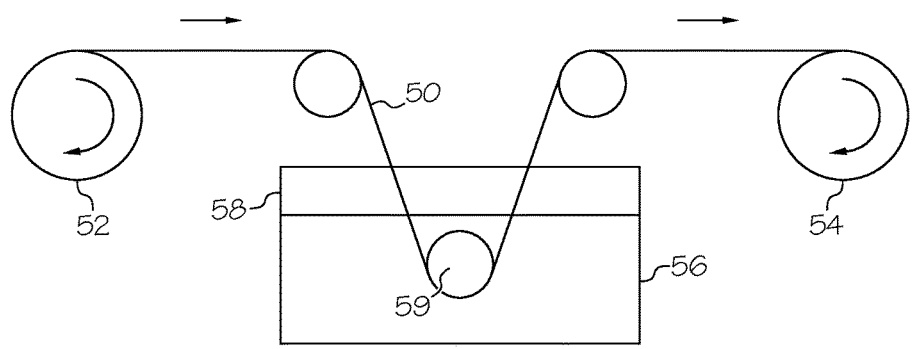
FIG. 8 is a side view of an apparatus for ion exchanging a glass ribbon, wherein the glass passes over a roller in a bath of molten salt.

As shown in FIG. 8, the use of bend stress in an ion exchange process for flexible glass can be utilized during so-called reel-to-reel (RTR) processes, where a thin, flexible glass ribbon 50 can be conveyed during processing from a source reel 52 to a take-up reel 54. Processing of the glass ribbon, such as edge grinding, polishing, film deposition, or any other known or future process steps can be performed at one or more locations between the source reel and the take-up reel. Although conditions can be varied to accommodate typical reel-to-reel traverse speeds, the glass ribbon can be conveyed such that the glass ribbon is immersed in a molten salt bath 56 within a container 58. The glass ribbon 50 can be conveyed over one or more rollers 59 that can be used to create bend stress in the glass ribbon or masking of one glass surface while the glass ribbon is conveyed through the molten salt bath and a subsequent accelerated ion exchange of the flexible glass. Alternatively by minimizing the differential bend stress, RTR conveyance processes can also be used to achieve symmetrical ion exchange profiles with DOL greater than 25% of the overall substrate thickness. An asymmetric exchange process is also achievable by use of a loop in the glass ribbon during the RTR conveyance through the salt bath. An asymmetric exchange process is also achievable by conveying the glass ribbon on the surface of the salt bath where one side of the glass ribbon has less interaction with the salt than the other side. An asymmetric exchange process is also possible in a reel-to-reel process by having one surface of the glass ribbon coated with a masking layer. Besides a continuous reel-to-reel process, these general processes are also possible with discrete sheets of flexible glass substrates conveyed with roller systems.

The techniques disclosed herein can be utilized in the ion exchange of other flexible glass applications that include strengthened glass sheets, the production of antimicrobial surfaces, and optical waveguides.

Figure 9:
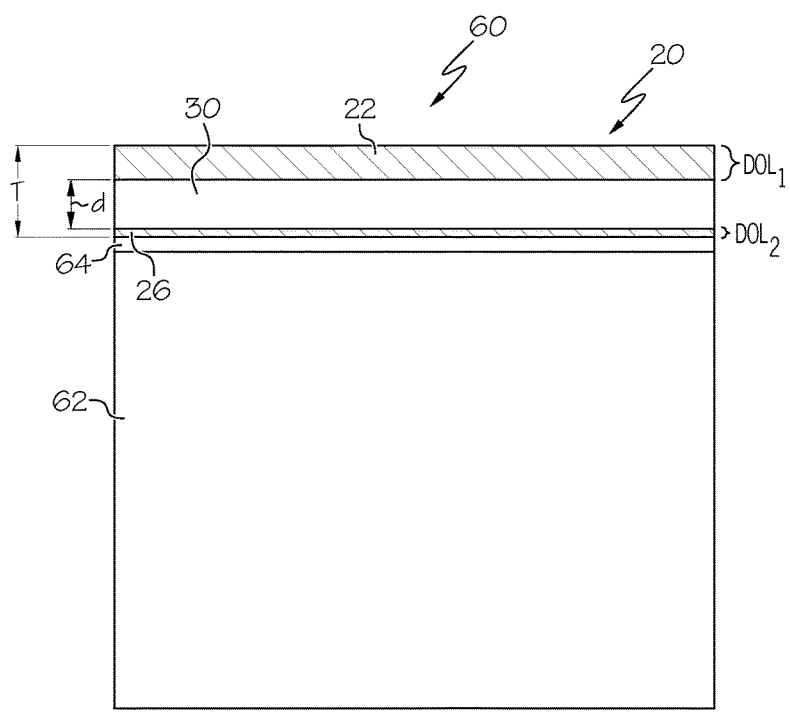
FIG. 9 is a cross sectional side view of an article comprising an asymmetrically ion exchanged substrate, wherein one depth of layer is illustrated as greater than 25% of the thickness of the glass substrate and another depth of layer is illustrated as less than 25% of the thickness of the glass substrate.

As noted previously, an ion exchanged flexible glass substrate can be combined with an overall laminated structure to create complex compressive stress profiles in the glass. This flexible glass substrate can be either symmetrically or asymmetrically ion exchanged and the DOL at one or both major substrate surfaces can be greater than 25% of the overall substrate thickness. For example, flexible glass sheets can be ion exchanged asymmetrically to create a compressive stress equal to or greater than 500 MPa (megapascal), and in some embodiments equal to or greater than 950 MPa, at a surface of the glass substrate and a depth of layer equal to or greater than 10 μm on the outside-facing surface (i.e. surface 24) of a laminated stack. The process of laminating the flexible glass to an underlying polymer or metal stack can create an additive compressive stress profile, and the combination profile can provide an overall complete reliability solution to the application. This may occur, for example, because the asymmetric depth of layer, and therefore the asymmetric stress profile, can cause the ion exchanged glass substrate to exhibit a curved natural state. If the glass is flattened during application of the glass to the underlying article, the flattening can induce additional compressive stress in a surface of the glass. The complex compressive stress profile can also be created by the additive ion exchanged compressive stress in combination with any differential expansions or contractions of the exchanged substrate and the laminate layers such as due to differential thermal expansion or other mechanisms. Shown in FIG. 9 is a laminated structure 60 comprising a chemically strengthened glass substrate 20 bonded to an underlying substrate 62. Glass substrate 20 may be bonded to substrate 62, for example, using an adhesive layer 64. Underlying substrate 62 may comprise any suitable polymer or metal, and may comprise, for example, an appliance such as a refrigerator, a stove, a table or any other device, apparatus or structure that might benefit from a damage resistant glass layer. In some embodiments, substrate 62 may comprise materials other than a polymer or metal. In differing applications it may be advantageous to have the surface with higher DOL to be opposite to the laminated layers. In other applications it may be advantageous to have the higher DOL surface laminated on the inside of the stack if it will experience higher tensile stresses during use. Additionally, the laminated structure need not be a planar design as shown in FIG. 9. The laminated structure that includes the asymmetrically ion exchanged glass may be in a convex, concave, or complex curvature shape. The laminated structure need not be a static shape but can also be flexed dynamically during its use. The laminated structure can be formed with the use of an adhesive or other method of bonding layers together. To meet different application requirements, the asymmetrically ion exchanged flexible glass can be bonded to thin polymer films or coatings, metal foils, or other layers. For example, the flexible glass need not be thinner than the other layers it is bonded to in the overall laminated structure.

As an example of a glass substrate that has been chemically strengthened to achieve a DOL greater than 25% of the overall thickness, a 100 μm thick glass substrate was used. In one case, both major surfaces of the glass substrate were ion exchanged substantially the same (e.g. symmetrically) to produce similar DOL values on each surface. For the 100 μm thick substrate, the DOL achieved on both major surfaces was greater than 30 μm. To demonstrate asymmetrical ion exchange, a DOL greater than 40 μm was created on one major surface of the 100 μm glass substrate with substantially no ion exchange occurring on the other surface. The substrates ion exchanged in these examples were able to be bent to a radius smaller than non-ion exchanged substrates.

As another example of a glass substrate that has been chemically strengthened to achieve a DOL greater than 25% of the overall thickness, a sodium aluminosilicate glass sheet (Corning® code 2319 glass) was redrawn to a 50 μm thickness. The glass sheet was symmetrically ion-exchanged at 420° C. for 1 hour and 35 minutes to produce an average depth of layer of approximately 20.25 μm (e.g. 40.5% of the average thickness of the glass substrate) on each surface of the substrate. The compressive stress at each depth of layer averaged 642 MPa, and the substrate was easily manipulated without any apparent frangibility.

It will be apparent to those skilled in the art that various modifications and variations can be made to the present embodiments without departing from the spirit and scope thereof. Thus it is intended that the present embodiments cover such modifications and variations provided they come within the scope of the appended claims and their equivalents.

What is claimed is:

1. A laminate article comprising:
   a first substrate; and
   a second substrate comprising a first surface and a second surface opposite the first surface, wherein an average thickness of the second substrate between the first surface and the second surface is equal to or less than about 0.3 mm, the second surface being bonded to the first substrate, the second substrate comprising:
   a glass substrate including;
   a first compressive stress layer extending inward toward a center of the glass substrate from the first surface comprising a first depth of layer $DOL_1$;
   a second compressive stress layer extending inward toward the center of the glass substrate from the second surface comprising a second depth of layer $DOL_2$;
   wherein $DOL_1$ is greater than $DOL_2$; and
   wherein $DOL_1$ is greater than 25% of the average thickness of the glass substrate.

2. The laminate article according to claim 1, wherein the first substrate comprises a polymer.

3. The laminate article according to claim 1, wherein the first substrate comprises metal.

4. The laminate article of claim 1, wherein $DOL_1$ is at least 2% greater than $DOL_2$.

5. The laminate article of claim 1, wherein $DOL_1$ is at least 6% greater than $DOL_2$.

6. The laminate article of claim 1, wherein $DOL_1$ is at least 10% greater than $DOL_2$.

7. The laminate article of claim 1, wherein the compressive stress at the first surface of the second substrate is at least 500 MPa.

8. The laminate article of claim 1, wherein the compressive stress at the first surface of the second substrate is at least 950 MPa.

9. The laminate article of claim 1, wherein the compressive stress at the second surface of the second substrate is at least 850 MPa.

* * * * *